(12) United States Patent
Shen et al.

(10) Patent No.: US 11,305,704 B2
(45) Date of Patent: Apr. 19, 2022

(54) FIVE-AXIS ANGULAR ADJUSTMENT AND AZIMUTH ROTATION MECHANISM

(71) Applicant: SHENZHEN MAXMADE AUTO ELECTRONICS CO., LTD., Shen zhen (CN)

(72) Inventors: Dayong Shen, Shen zhen (CN); Weiping Zhong, Shen zhen (CN)

(73) Assignee: SHENZHEN MAXMADE AUTO ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 17/092,366

(22) Filed: Nov. 9, 2020

(65) Prior Publication Data
US 2021/0347311 A1 Nov. 11, 2021

(30) Foreign Application Priority Data
May 7, 2020 (CN) .......................... 202010376550.9

(51) Int. Cl.
*H04N 5/64* (2006.01)
*B60R 11/02* (2006.01)
*F16M 11/18* (2006.01)

(52) U.S. Cl.
CPC ......... *B60R 11/0229* (2013.01); *F16M 11/18* (2013.01)

(58) Field of Classification Search
CPC ............... B60R 11/0229; B60K 35/00; B60K 2370/816; B60K 2370/67; B60K 2370/91; B60K 2370/152; F16M 11/18
USPC ................. 348/837, 836, 840; 386/358, 359
See application file for complete search history.

(56) References Cited

U.S. PATENT DOCUMENTS

2021/0190259 A1* 6/2021 Newville ............... F16M 11/08

FOREIGN PATENT DOCUMENTS

JP 209955898 U * 1/2020

* cited by examiner

*Primary Examiner* — Robert Chevalier

(57) ABSTRACT

The five-axis angular adjustment and azimuth rotation mechanism relates to the field of products for vehicle-mounted display screens and in particular relates to a five-axis angular adjustment and azimuth rotation mechanism, including a display screen assembly, wherein a turning mechanism assembly is connected to one side of the display screen assembly via bolts, a panel assembly is arranged on one side of the turning mechanism assembly via bolts, and a main machine assembly is arranged on one side of the panel assembly via bolts, and the display screen assembly includes a first linear sliding mechanism, a first axial rotation mechanism, a second axial rotation mechanism and a third axial rotation mechanism, the first linear sliding mechanism includes two screen bars arranged on one side of the display screen assembly via bolts. The disclosure is suitable for different vehicle types.

8 Claims, 5 Drawing Sheets

FIVE-AXIS ANGULAR ADJUSTMENT AND AZIMUTH ROTATION MECHANISM

CROSS-REFERENCE TO RELATED APPLICATIONS

The application claims priority to Chinese patent application No. 202010376550.9, filed on May 7, 2020, the entire contents of which are incorporated herein by reference.

TECHNICAL FIELD

The present disclosure relates to the field of products for vehicle-mounted display screens and in particular relates to a five-axis angular adjustment and azimuth rotation mechanism.

BACKGROUND

As the size of the display screen becomes larger and larger, the technology becomes more and more mature and the cost becomes lower and lower, the trend of a large size of the display screen for electronic products is very obvious, and vehicle-mounted products are no exception. However, many types of vehicles are limited due to space or layout, and some types of vehicle can only be equipped with display screens of 3.5 inches or less. In order to meet the requirements of more vehicle types to realize the installation of large-size vehicle-mounted display products, in order to require the best viewing angle (front and rear positions, left and right positions, and pitching can be adjusted) of the display screen, and horizontal display or vertical display in different applications to present the most complete and optimal display ratio picture to consumer users, and in order to adapt to different vehicle types and the observation angles and usage habits of passengers or drivers in different seats in the vehicles, it is very necessary to have an angle adjustable display screen.

The Chinese patent CN201810699953.X discloses an adjustable vehicle-mounted display screen mounting structure, which includes a base, a fixing bracket, connecting brackets, a display screen, a first adjusting bolt and a second adjusting bolt, wherein the base is strip-shaped and is provided with a track hole along a length direction; a central part of the fixing bracket is provided with a through hole, and the fixing bracket is fixed on the base by a way that the first adjusting bolt sequentially passes through the through hole and the track hole to be connected with a nut under the base in a matching manner; two ends of the fixing bracket are respectively fixedly connected with one end of each of the two connecting brackets, and middle parts of the two connecting brackets are provided with strip-shaped holes running up and down; a left side and a right side of a shell of the display screen are respectively provided with threaded holes, and a left side and a right side of the display screen are fixed on the two connecting brackets by a way that the second adjusting bolt passes through the strip-shaped holes to be connected with the threaded holes. The display screen mounting structure can realize the position adjustment of the vehicle-mounted display screen, is convenient for passengers of different postures to watch or operate, improves the user experience, and has certain seismic strength and strong structural reliability.

The existing vehicle-mounted display screen adjusting structure cannot change the rotation direction or adjust the azimuth of the display screen well, cannot adjust the display screen to the best visual position, cannot well avoid the interference with the display screen or obstruction on the original vehicle, and cannot meet the requirements of different vehicle types and satisfy the observation angles and usage habits of passengers or drivers in different seats. Therefore, it is urgent to develop a five-axis angular adjustment and azimuth rotation mechanism.

SUMMARY

The purpose of the present disclosure is to provide a five-axis angular adjustment and azimuth rotation mechanism to solve the shortcomings in the prior art that the existing vehicle-mounted display screen adjusting structure cannot change the rotation direction or adjust azimuth of the display screen well, cannot adjust the display screen to the best visual position, cannot well avoid the interference with a display screen or obstruction on an original vehicle, and cannot meet the requirements of different vehicle types and satisfy the observation angles and usage habits of passengers or drivers in different seats.

The technical solution of the present disclosure is that: the five-axis angular adjustment and azimuth rotation mechanism includes a display screen assembly, wherein a turning mechanism assembly is connected to one side of the display screen assembly via bolts, a panel assembly is arranged on one side of the turning mechanism assembly via bolts, and a main machine assembly is arranged on one side of the panel assembly via bolts, and the display screen assembly includes a first linear sliding mechanism, a first axial rotation mechanism, a second axial rotation mechanism and a third axial rotation mechanism; the first linear sliding mechanism includes two screen bars arranged on one side of the display screen assembly via bolts, and a screen slider is connected between the two screen bars in a sliding manner; the first axial rotation mechanism includes a rotation casing and a connecting casing A; the connecting casing A, a connecting casing B and a damping connecter are arranged on the second axial rotation mechanism; the third axial rotation mechanism includes the connecting casing B, a fixing plate and a damping connecter; and a second linear sliding mechanism is arranged on one side of the fixing plate, i.e., inside the main machine assembly.

Further, the first linear sliding mechanism includes a damping wheel and a bull's eye resistor, and the damping wheel is meshed with the slider.

Further, mounting slots and mounting holes are symmetrically distributed in two sides of the display screen assembly, and the damping wheel and the bull's eye resistor are arranged in the mounting slots and mounting holes respectively.

Further, one side of each of the screen bars is provided with a slide groove, a slide block is integrally formed on side of the screen slider, and is connected in the slide groove in a sliding manner.

Further, the second linear sliding mechanism includes a connecting slider and a guiding block, the connecting slider is arranged on a bottom casing via bolts, a plane of the connecting slider is provided with a plurality of equally spaced adjustment holes, and the guiding block is fixed on the bottom casing via bolts.

Further, a holed rotation shaft is integrally formed at one side of the fixing plate, and is inserted into an insertion hole, and one end of the holed rotation shaft is provided with a limiting piece.

Further, the main machine assembly includes a top casing, a main panel assembly is arranged on a bottom of the top casing via bolts, and the bottom casing is arranged on two sides of the top casing via bolts.

Further, a cooling fin is arranged on one side of the main panel assembly via bolts.

The present disclosure provides the five-axis angular adjustment and azimuth rotation mechanism through improvement, and compared with that prior art, the mechanism has the following advantages.

(1) By using five-axis angle adjustment, a display screen of a vehicle-mounted product can be adjusted by five axes, and the upper and lower positions, front and rear positions, left and right and up and down rotation angles, 90-degree horizontal and vertical screen switching angles of the display screen can be adjusted, so that the display screen can be adjusted to a best visual position, the interference with the display screen or obstruction on the original vehicle is avoided, the mechanism is suitable for different vehicle types, the observation angles and usage habits of passengers or drivers in different seats. In brief, a display screen with an adjustable angle is very necessary.

(2) Through the set turning mechanism assembly, by means of external force or installation presetting, the upper and lower positions of the display screen, the pitch angle of the display screen, and the left and right angles of the display screen can be adjusted, and the horizontal and vertical rotation of the display screen can be realized, thus realizing the four-axis angular adjustment and azimuth rotation.

(3) Through the set second linear sliding mechanism, the corresponding installation angle can be selected according to the vehicle type and the user's habits before installation, and then the corresponding installation angle is fixed by inserting screws into the adjustment holes for fastening, thus realizing the front and rear movement of the display screen and facilitating the adjustment of the front and rear positions of the display screen by the user.

BRIEF DESCRIPTION OF DRAWINGS

The present disclosure will be further explained below with reference to the drawings and embodiments.

DETAILED DESCRIPTION OF THE EMBODIMENTS

Figure 1:
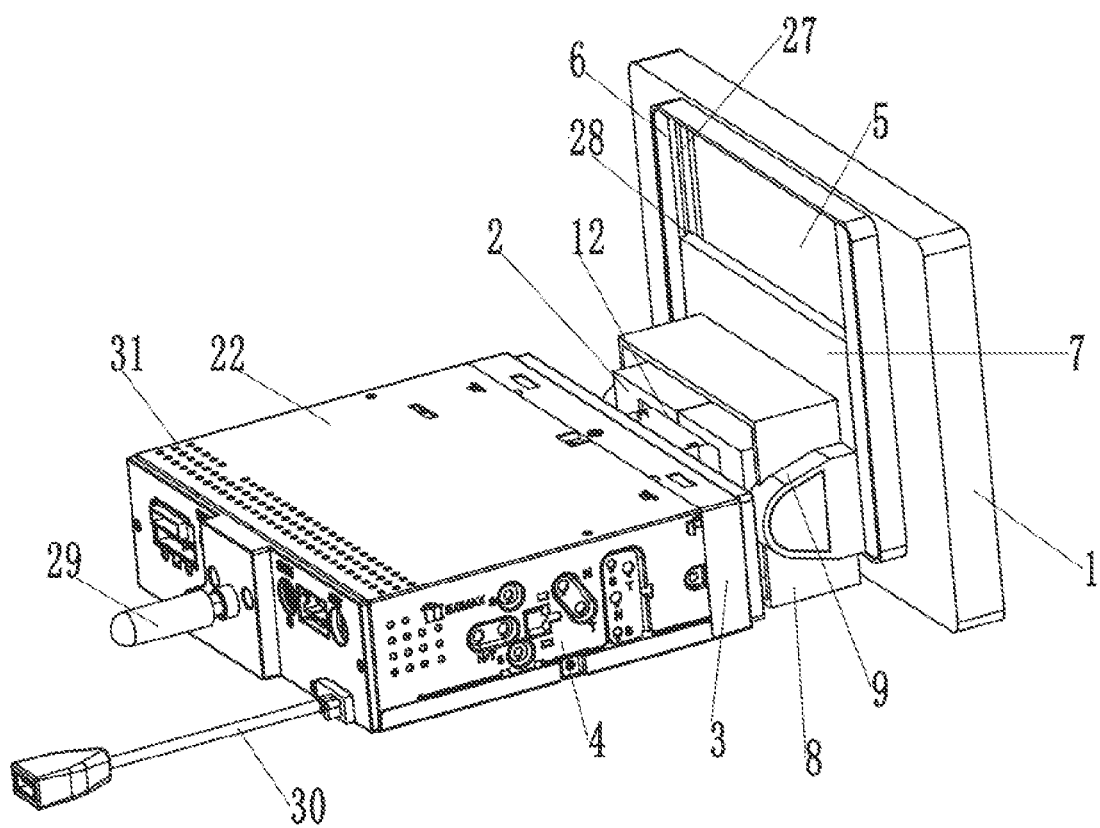
FIG. 1 is a schematic view of an overall three-dimensional structure of the present disclosure.
Figure 2:
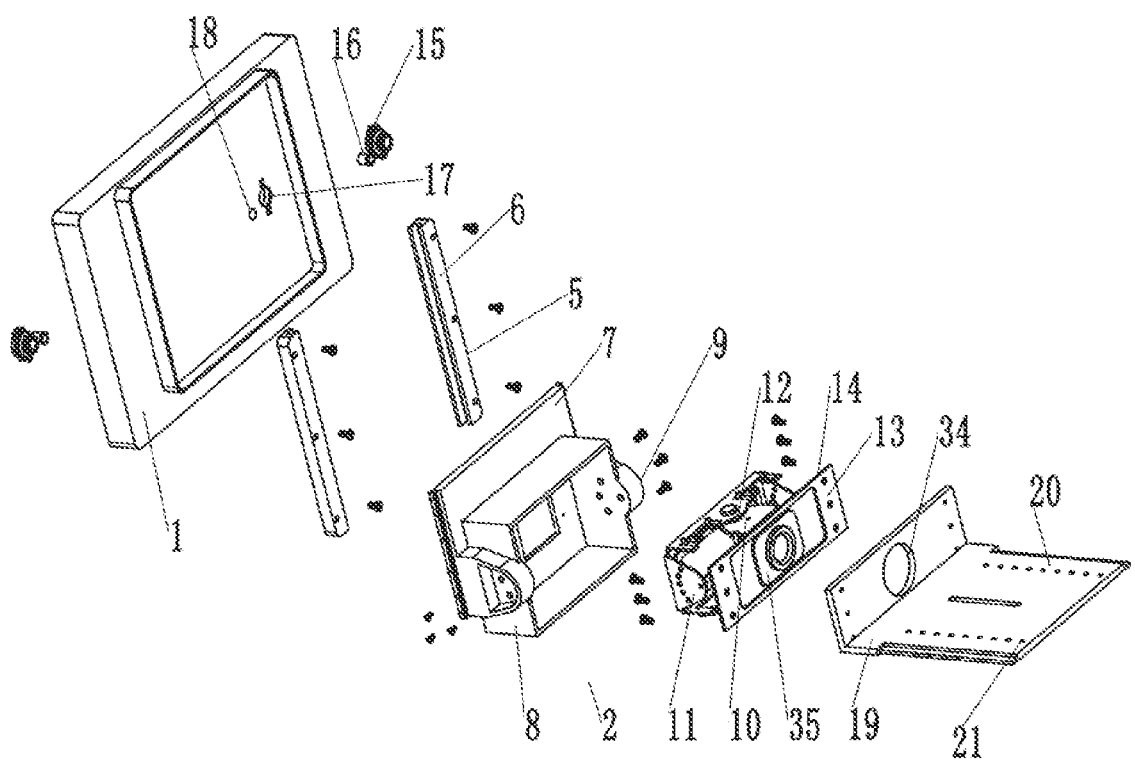
FIG. 2 is a schematic view of a first explosive three-dimensional structure of the present disclosure.
Figure 3:
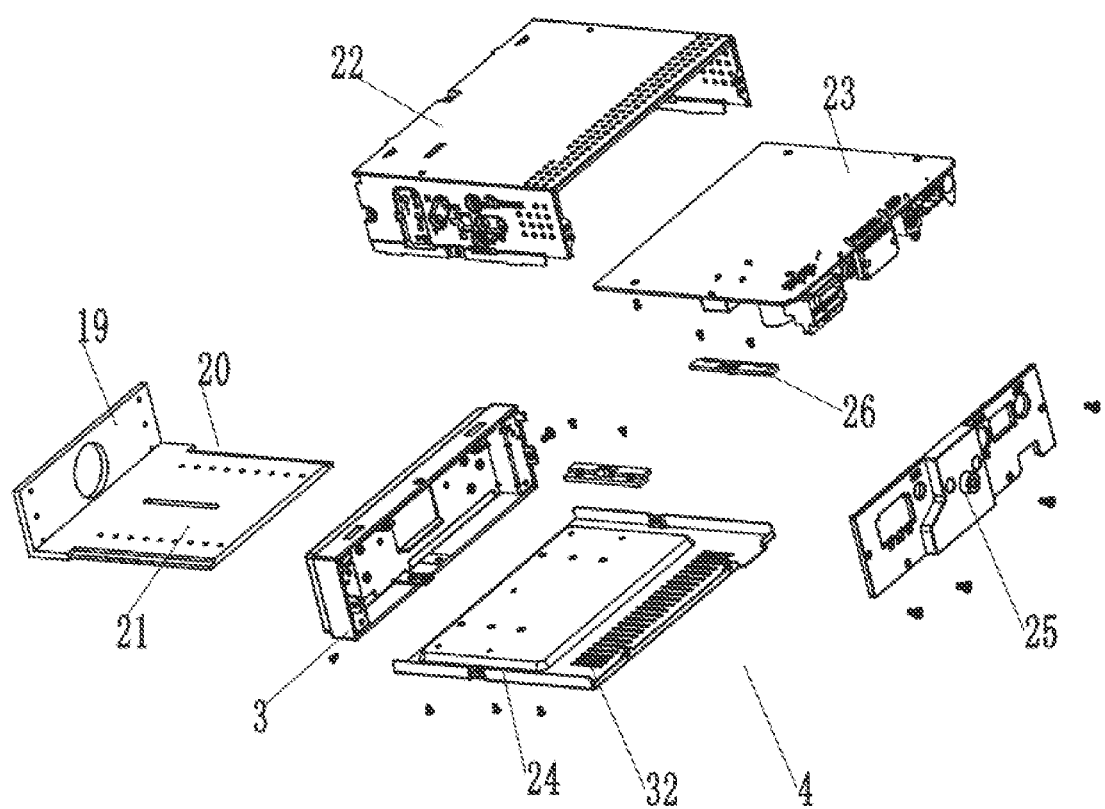
FIG. 3 is a schematic view of a second explosive three-dimensional structure of the present disclosure.
Figure 4:
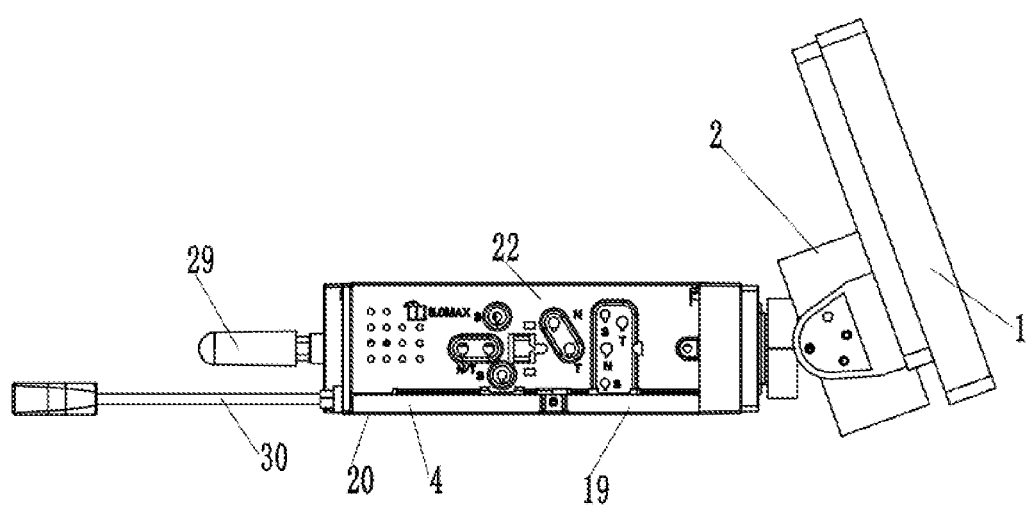
FIG. 4 is a side view of the present disclosure.
Figure 5:
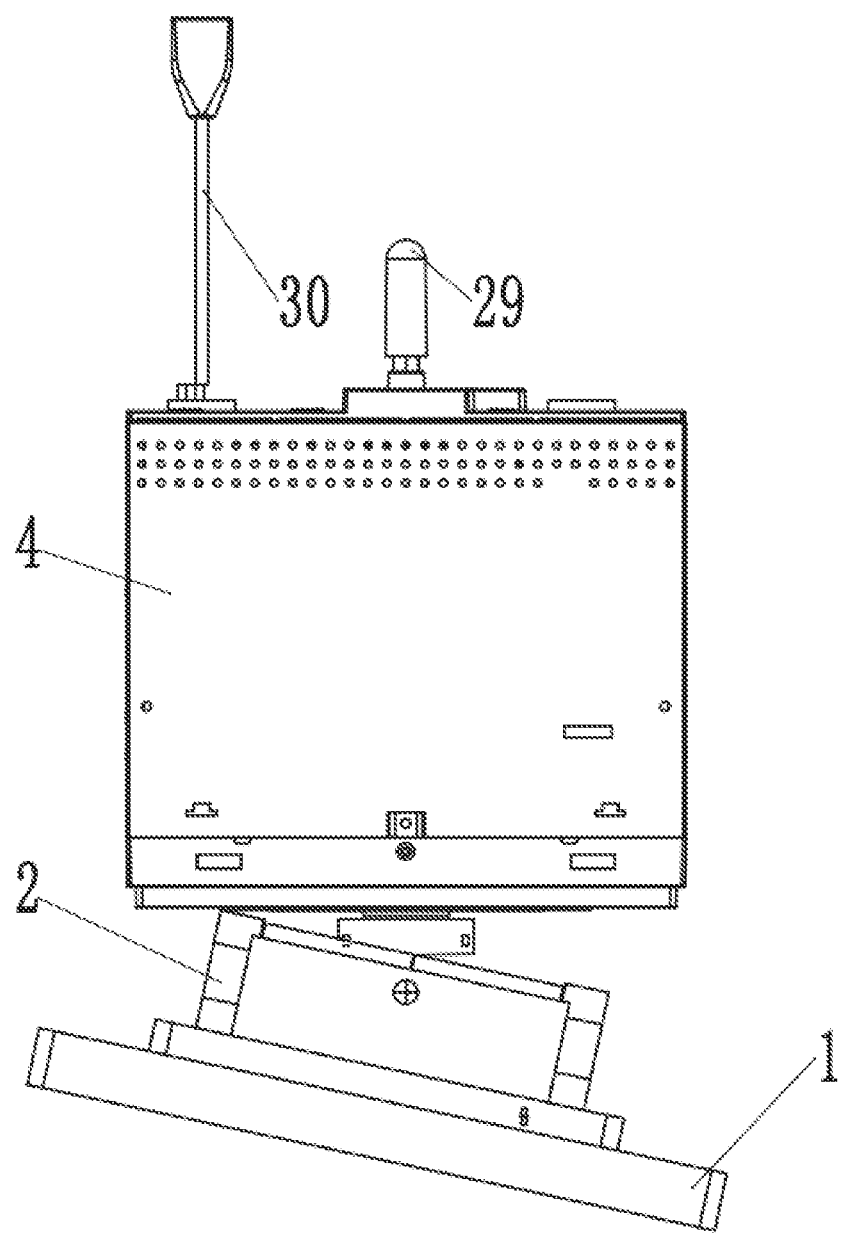
FIG. 5 is a top view of the present disclosure.

The present disclosure will now be described in detail with reference to FIGS. 1 to 5, and the technical solution of the present disclosure will be described clearly and completely, and it will be apparent that the described embodiments are only part of the embodiments of the present disclosure, and not all of them. Based on the embodiments in the present disclosure, all other embodiments obtained by those of ordinary skill in the art without creative work fail within the scope of protection of the present disclosure.

The present disclosure provides a five-axis angular adjustment and azimuth rotation mechanism through improvement, as shown in FIGS. 1 to 5, the mechanism includes a display screen assembly 1, wherein a turning mechanism assembly 2 is connected to one side of the display screen assembly 1 via bolts, through the set turning mechanism assembly, by means of external force or installation presetting, the upper and lower positions of a display screen, the pitch angle of the display screen, and the left and right angles of the display screen can be adjusted, and the horizontal and vertical rotation of the display screen can be realized, thus realizing four-axis angular adjustment and azimuth rotation; a main machine assembly 4 is arranged on one side of the turning mechanism assembly 2 via bolts, and the display screen assembly 1 includes a first linear sliding mechanism 5, a first axial rotation mechanism 9, a second axial rotation mechanism 12 and a third axial rotation mechanism 14; the first linear sliding mechanism 5 includes two screen bars 6 arranged on one side of the display screen assembly 1 via bolts, and a screen slider 7 is connected between the two screen bars 6 in a sliding manner; the display screen can move up and down via the first linear sliding mechanism 5; the first axial rotation mechanism 9 includes a rotation casing 8 and a connecting casing A 11; the connecting casing A 11 is arranged on the second axial rotation mechanism 12; the rotation casing 8 can rotate on the connecting casing A 11 by adopting the first axial rotation mechanism 9, during the angle adjustment of the axis, the rotation casing 8 rotates by a certain angle along a rotation shaft relative to the connecting casting A 11, and the display screen can do pitching angle adjustment movement; the connecting casing A 11 and a connecting casing B 10 are arranged on the second axial rotation mechanism 12, and the connecting casing A 11 is rotationally connected with the connecting casing B 10 through a rotation shaft and a damping fastener, and the connecting casing A 11 can rotate on the connecting casing B 10 by adopting the second axial rotation mechanism 12, during the angle adjustment of the axis, the connecting casing A 11 rotates by a certain angle along the rotation shaft relative to the connecting casing B 10, and the left and right angle adjustment movement of the display screen can be realized; the third axial rotation mechanism 14 includes a fixing plate 13 which is in rotational connection with the connecting casing B 10 via a rotation shaft and a damping fastener, the connecting casing B 10 can rotate on the fixing plate 13 by adopting the third axial rotation mechanism 14, and during the angle adjustment of the axis, the connecting casing B 10 rotates by a certain angle along the rotation shaft relative to the fixing plate 13, and the horizontal and vertical screen switching of the display screen is realized; a second linear sliding mechanism 20 is arranged on one side of the fixing plate 13, i.e., inside the main machine assembly, and by the adoption of the second linear sliding mechanism 20, the display screen can move front and back; and a linear movement length is 40 mm, the forward movement of every 10 mm is considered as one gear, and there are totally four gears. The display screen of the vehicle-mounted product can achieve the following effects by the fix-axis adjustment: the rotation direction or azimuth adjustment of the display screen can be changed, so that the display screen is adjusted to the best visual position, the interference with the display screen or obstruction on the original vehicle is avoided, and the mechanism can be suitable for different vehicle types, and the observation angles and usage habits of passengers or drivers in different seats.

Further, the first linear sliding mechanism 5 includes a damping wheel 15 and a bull's eye resistor 16, and the damping wheel 15 is meshed with the slider 7.

Further, mounting slots 17 and a mounting holes 18 on both sides are symmetrically distributed in two sides of the display screen assembly 1, and the damping wheel 15 and the bull's eye resistor 16 are arranged in the mounting slots 17 and mounting holes 18 respectively, the horizontal and vertical rotation movement of the display screen is realized by the clamping wheel 15 and the bull's eye resistor 16.

Further, one side of each of the screen bars 6 is provided with a slide groove 27, a slide block 28 is integrally formed on one side of the screen slider 7, and is connected in the slide groove 27 in a sliding manner. The slide block 28 on each of the two sides of the screen slider 7 slides in the corresponding slide groove 27, so that the display screen can move up and down. A linear movement length is 45 mm, and a user can adjust by himself after the display screen is arranged on a vehicle.

Further, the second linear sliding mechanism 20 includes a connecting slider 19 and a guiding block 26 the connecting slider 19 is arranged on a bottom casing 24 via bolts, a plane of the connecting slider 19 is provided with a plurality of equally spaced adjustment holes 21, and the guiding block 26 is fixed on the bottom casing 24 via bolts. Since the connecting slider 19 is provided with a plurality of adjustment holes 21, a bottom of the bottom casing 24 can align with the different adjustment holes 21 to mount screws so as to realize the front and back movement of the display screen.

Further, a holed rotation shaft 33 is integrally formed at one side of the fixing plate 13, and is inserted into an insertion hole 34, one end of the holed rotation shaft 33 is connected with a limiting piece 35 in a clamping manner, and the limiting piece 35 can fix the holed rotation shaft 33 in the insertion hole 34.

Further, a cooling fin 25 is arranged on one side of a main panel assembly 23 via bolts. The cooling fin 25 can conduct heat exchange on heat generated in the main panel assembly 23 to reduce the working temperature of the main panel assembly.

Further, the bottom casing 24 is provided with a ventilation grille 32, a USB 30 is arranged at a corner of an outer wall on one side of a top casing 22 for data connection of the display screen, a fixing tail cone 29 is arranged at the center of an outer wall of one side of the top casing 22 to facilitate installation and positioning of an overall device, and an outer wall of a top of the top casing 22 is provided with ventilation holes 31 distributed at equal distances to facilitate air circulation inside the top casing 22.

Further, the main machine assembly 4 includes the top casing 22, the main panel assembly 23 is arranged on a bottom of the top casing 22 via bolts, and the bottom casing 24 is arranged on two sides of the top casing 22 via bolts. The top casing 22 and the bottom casing 24 are mounted via the bolts so as to be capable of protecting the main panel assembly 23.

The working principle is as follows: before installation, the corresponding installation angle is selected according to the vehicle type and the user's habits, then, the second linear sliding mechanism 20 is adopted, the display screen can move back and forth (in a direction from a vehicle head to a vehicle tail), the linear movement length is 40 mm, the forward movement of every 10 mm is considered as one gear, there are totally four gears, the bottom casing 24 of the main machine assembly 4 is mounted on the connecting slider 19, since the connecting slider 19 is provided with the plurality of adjustment holes 21, the screws can be mounted after the holes in the bottom of the bottom casing 24 are aligned with the different adjustment holes 21 to realize the back and forth movement of the display screen, and after the screws are inserted into the adjustment holes 21 in the connecting slider 19 for fixation and fixation, it is convenient for the user to adjust the front and rear positions of the display screen. The first linear sliding mechanism 5 is adopted, the slide blocks on the two sides of the screen slider 7 slide in the slide grooves 27, the display screen can thus move up and down (in a direction between sky and earth), the linear motion length is about 45 mm, after the display screen is arranged on the vehicle, the user can adjust the display screen by himself. The first axial rotation mechanism 9 is adopted, the rotation casing 8 is capable of rotating on the connecting casing A 11, the display screen is capable of pitch angle adjustment movement, and 5-gear angles, namely a vertical angle, a 20-degree depression angle, a 40-degree depression angle, a 20-degree elevation angle and a 40-degree elevation angle, can be selected. During installation, the corresponding installation angle can be selected according to the vehicle type and the user's habits, then can be fixed after fastening of the screws, with the second axial rotation mechanism 12, the connecting casing B 10 rotates to one side of the fixing plate 13, the left-right angle adjustment movement of the display screen can be realized, the angle is optionally adjusted by a damping mechanism (maximum rotation angles are 12 degrees in left and right directions). After the display screen is installed, the user can adjust the display screen by himself. The third axial rotation mechanism 14 is adopted, by means of the damping wheel 15 and the bull's eye resistor 16, the horizontal and vertical rotational movement of the display screen is realized, and the display screen can be rotated horizontally and vertically by optionally adjusting the angle through the damping mechanism (similar to a mold screen and a vertical screen of a mobile phone). After the display screen is installed, the user can adjust the display screen by himself. Through the set turning mechanism assembly 2, by means of external force or installation presetting, the upper and lower positions of the display screen, the pitch angle of the display screen, and the left and right angles of the display screen can be adjusted, and the horizontal and vertical rotation of the display screen can be realized, thus realizing the four-axis angular adjustment and azimuth rotation. By changing the angle of the display screen of the vehicle-mounted product by five-axis adjustment, the display screen of the vehicle-mounted product can achieve the following effects: the rotation direction or azimuth adjustment of the display screen can be changed, the display screen can be adjusted to the best visual position, the interference with the display screen or obstruction on the original vehicle can be avoided, and the mechanism can be suitable for the different vehicle types and the observation angles and usage habits of passengers or drivers in different seats. Therefore, the angle-adjustable display screen is necessary.

Through the above description of the disclosed embodiments, those skilled in the art can practice or use the present disclosure. Various modifications to these embodiments will be apparent to those skilled in the art, and the general principles defined herein may be implemented in other embodiments without departing from the spirit or scope of the present disclosure. Therefore, the present disclosure will not be limited to the embodiments shown herein, but will conform to the widest scope consistent with the principles and novel features disclosed herein.

What is claimed is:

1. A five-axis angular adjustment and azimuth rotation mechanism, comprising a display screen assembly, wherein a turning mechanism assembly is connected to one side of the display screen assembly via bolts, a panel assembly is arranged on one side of the turning mechanism assembly via bolts, and a main machine assembly is arranged on one side of the panel assembly via bolts, and the display screen assembly comprises a first linear sliding mechanism, a first axial rotation mechanism, a second axial rotation mechanism and a third axial rotation mechanism; the first linear sliding mechanism comprises two screen bars arranged on one side of the display screen assembly via bolts, and a screen slider is connected between the two screen bars in a sliding manner; the first axial rotation mechanism comprises a rotation casing and a connecting casing A; the connecting casing A, a connecting casing B and a damping connecter are arranged on the second axial rotation mechanism; the third axial rotation mechanism comprises the connecting casing B, a fixing plate and a damping connecter; and a second linear sliding mechanism is arranged on one side of the fixing plate, i.e., inside the main machine assembly.

2. The five-axis angular adjustment and azimuth rotation mechanism according to claim 1, wherein the first linear sliding mechanism comprises a damping wheel and a bull's eye resistor, and the damping wheel is meshed with the slider.

3. The five-axis angular adjustment and azimuth rotation mechanism according to claim 1, wherein mounting slots and mounting holes are symmetrically distributed in two sides of the display screen assembly, and the damping wheel and the bull's eye resistor are arranged in the mounting slots and the mounting holes respectively.

4. The five-axis angular adjustment and azimuth rotation mechanism according to claim 1, wherein one side of each of the screen bars is provided with a slide groove, a slide block is integrally formed on one side of the screen slider, and the slide block is connected in the slide groove in a sliding manner.

5. The five-axis angular adjustment and azimuth rotation mechanism according to claim 1, wherein the second linear sliding mechanism comprises a connecting slider and a guiding block, the connecting slider is arranged on a bottom casing via bolts, a plane of the connecting slider is provided with a plurality of equally spaced adjustment holes, and the guiding block is fixed on the bottom casing via bolts.

6. The five-axis angular adjustment and azimuth rotation mechanism according to claim 5, wherein a holed rotation shaft is integrally formed at one side of the fixing plate, and is inserted into an insertion hole, and one end of the holed rotation shaft is provided with a limiting piece.

7. The five-axis angular adjustment and azimuth rotation mechanism according to claim 1, wherein the main machine assembly comprises a top casing, a main panel assembly is arranged on a bottom of the top casing via bolts, and the bottom casing is arranged on two sides of the top casing via bolts.

8. The five-axis angular adjustment and azimuth rotation mechanism according to claim 7, wherein a cooling fin is arranged on one side of the main panel assembly via bolts.

* * * * *